United States Patent
Buzby, Jr. et al.

[15] 3,686,317
[45] Aug. 22, 1972

[54] A-NOR-13-ETHYL-17-HYDROXY-A-NORGON-3-EN-2-ONE

[72] Inventors: George C. Buzby, Jr., Philadelphia; Charles R. Walk, King of Prussia; Herchel Smith, Wayne, all of Pa.

[73] Assignee: American Home Products Corporation, New York, N.Y.

[22] Filed: Sept. 17, 1968

[21] Appl. No.: 760,304

Related U.S. Application Data

[63] Continuation of Ser. No. 536,438, March 22, 1966, abandoned.

[52] U.S. Cl. ........260/586 H, 260/397.4, 260/488 B, 260/514 R, 260/999
[51] Int. Cl. .............................................. C07c 49/44
[58] Field of Search ...............260/448 B, 514, 586 H

[56] References Cited

UNITED STATES PATENTS

| | | |
|---|---|---|
| 3,210,406 | 10/1965 | Weisenborn ...............260/586 |
| 3,110,733 | 11/1963 | Weisenborn et al. ......260/586 |
| 3,439,022 | 4/1969 | Jacques .....................260/488 |
| 3,439,040 | 4/1969 | Jacques .....................260/488 |

*Primary Examiner*—Vivian Garner
*Attorney*—Vito Victor Bellino

[57] ABSTRACT

The invention is directed to the compound dl-13-ethyl-17-hydroxy-A-norgon-3-en-2-one showing androgenic and anabolic activity.

1 Claim, 2 Drawing Figures

INVENTORS
GEORGE C. BUZBY, JR.
CHARLES R. WALK
HERCHEL SMITH
BY Vito Victor Bellino
ATTORNEY

A-NOR-13-ETHYL-17-HYDROXY-A-NORGON-3-EN-2-ONE

This application is a continuation of Ser. No. 536,438 filed Mar. 22, 1966, now abandoned.

This application relates to compositions of matter classified in the art of chemistry as steroids, to intermediates therefor, and to processes for making them.

In describing the invention, reference will be made in the following specification to the annexed drawings, wherein.

Figure 1:
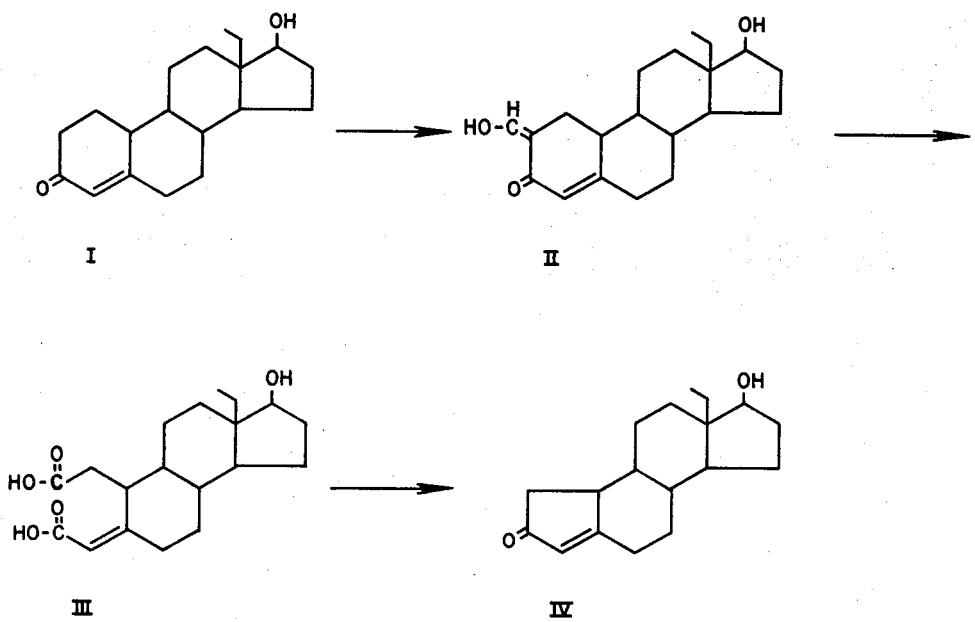
FIG. 1 illustrates schematically the reaction sequence for preparing a dl-13-polycarbonalkyl-A-norgon-3-en-2-one, specifically dl-13-ethyl-17-hydroxy-A-norgon-3-en-2-one.

The invention sought to be patented in a principal composition aspect, is described as residing in the concept of a dl-13-ethyl-A-norgon-3-en-2-one.

The tangible embodiments of the principal composition aspect of the invention possess the inherent general physical properties of being white crystalline solids, are substantially insoluble in water and are generally soluble in polar solvents such as dimethylacetamide. Examination of compounds produced according to the hereinafter described process reveals upon ultraviolet and infrared spectrographic analysis, spectral data supporting the molecular structure hereinbefore set forth. Thus, the diminution in A-ring size is evident in the infrared and the presence of the conjugate unsaturated ketone system is evident in the ultraviolet. The aforementioned physical characteristics, taken together with the nature of the starting materials and the mode of synthesis. Confirm the structure of the compositions sought to be patented.

The tangible embodiments of the principal composition aspect of the invention possess the inherent applied use characteristic of exerting qualitatively varying hormonal effects in animals as evidenced by pharmacological evaluation according to standard test procedures. For example, such tangible embodiments show androgenic and anabolic activities with a separation of these activities so that the ratio of the degree of these activities is altered in a manner unpredictable from the prior art.

This invention sought to be patented in a second composition aspect is described as residing in the concept of a dl-13-ethyl-2,3-seco-gona-4-ene-2,3-dioic acid.

The tangible embodiments of the second composition aspect of the invention possess the inherent general physical properties of being white crystalline solids, are substantially insoluble in water, and are generally soluble in polar solvents such as dimethylacetamide. Examination of compounds produced according to the hereinafter described process reveals upon ultraviolet and infrared spectrographic analyses, spectral data supporting the molecular structure hereinbefore set forth. Thus the acid carboxyl groups in the seco-A-ring are evident. The aforementioned physical characteristics, taken together with the nature of the starting materials and the mode of synthesis, confirm the structure of the compounds sought to be patented.

The tangible embodiment of the composition aspect of the invention possess the inherent applied use characteristics of being intermediates for the preparation of the principal composition aspect of the invention.

The invention sought to be patented in a third composition aspect is described as residing in the concept of a dl-13-ethyl-5α-A-norgonan-2-one.

The tangible embodiments of the principal composition aspect of the invention possess the inherent general physical properties of being white crystalline solids, are substantially insoluble in water and are generally soluble in polar solvents such as dimethylacetamide. Examination of compounds according to the hereinafter described process reveals upon ultraviolet and infrared spectrographic analyses, spectral data supporting the molecular structure hereinbefore set forth. Thus the diminution in A-ring size is evident in the infrared as is the presence of the 2-keto group. The aforementioned physical characteristics, taken together with the nature of the starting materials and the mode of synthesis, confirm the structure of the compositions sought to be patented.

The tangible embodiments of the third composition aspect of the invention possess the inherent applied use characteristics of exerting qualitatively varying hormonal effects in animals as evidenced by pharmacological evaluation according to standard test procedures. For example, such tangible embodiments show androgenic, mytropic and progestational activities with a separation of these activities so that the ratio of the degree of these activities is altered in a manner unpredictable from the prior art.

The invention sought to be patented in a fourth composition aspect is described as residing in the concept of a dl-13-ethyl-5α-2,3-seco-gonan-2,3-dioic acid.

The tangible embodiments of the fourth composition aspect of the invention possess the inherent general physical properties of being white crystalline solids, are substantially insoluble in water, and are generally soluble in polar solvents such as dimethylacetamide. Examination of compounds produced according to the hereinafter described process reveals upon ultraviolet and infrared spectrographic analyses, spectral data supporting the molecular structure hereinbefore set forth. Thus the acid carboxyl groups in the seco-A-ring are evident. The aforementioned physical characteristics, taken together with the nature of the starting materials and the mode of synthesis, confirm the structure of the compound sought to be patented.

The tangible embodiment of the composition aspect of the invention possess the inherent applied use characteristics of being intermediates for the third composition aspect of the invention.

The manner and process for making and using the invention will now be generally of so as to enable a person skilled in the art of chemistry to make and use the same, as follows:

Referring to FIG. 1, wherein the structural formulas are assigned Roman numerals for identification, the sequence of reactions involved in the synthesis of a specific embodiment, namely, dl-13-ethyl-17β-hydroxy-A-norgon-3-en-2-one, is illustrated.

The starting materials [I] for the preparation of the intermediate and final compositions of the invention are known in the art or may be prepared from known compounds by procedures known to those skilled in the art. Experimental procedures for their preparation are described by Smith, H. et al. in Jour. Chem. Soc. (1964) page 4472 to 4492 inclusive.

By condensation of a gon-4-en-3-one [I] in a hydrocarbon solvent such as benzene with an alkyl formate, preferably ethyl formate, in the presence of sodium hydride, there is obtained the corresponding 2-hydroxymethylene-gon-4-en-3-one [II]. The product is isolated by conventional means, and ozonized in a solvent with one mole equivalent of ozone at temperatures below 0° C, preferably about −15° C. in a suitable solvent, as for example, a 1/1 volume mixture of ethylacetate and acetic acid, to obtain the corresponding 2,3-seco-gona-4-ene-2,3-dioic acid [III]. Pyrolysis of this acid gives the corresponding A-norgon-3-en-2-one [IV].

Figure 2:
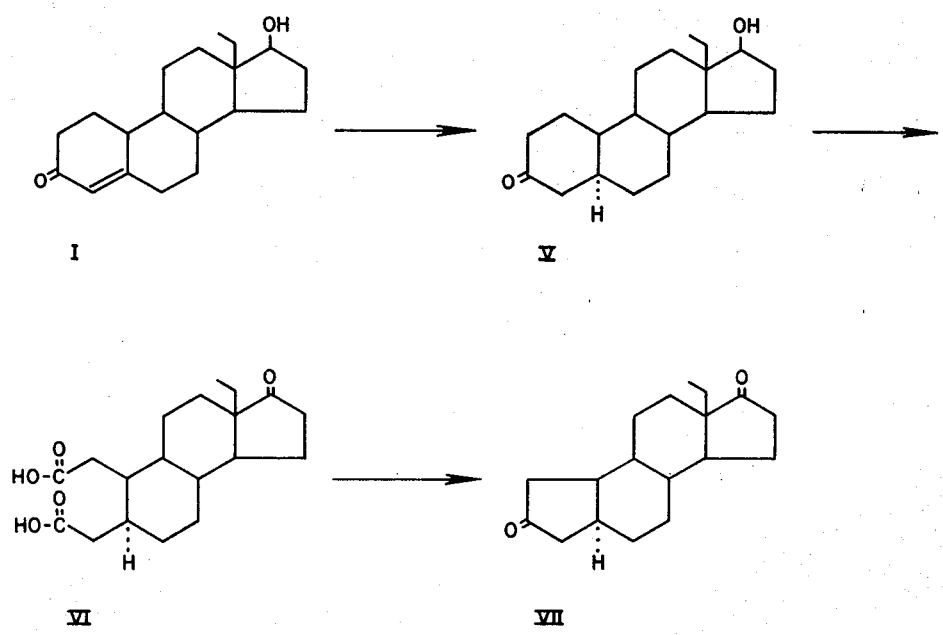
FIG. 2 illustrates schematically the reaction sequence for preparing a dl-13-polycarbonalkyl-5α-A-norgonan-2-one, specifically dl-13-ethyl-17-oxo-5α-A-norgonan-2-one.

Referring to FIG. 2 where the structural formulas are also assigned Roman numerals for identification, the sequence of reactions involved in the synthesis of a specific embodiment, namely, dl-13-ethyl-17$\beta$-hydroxy-5$\alpha$-A-norgonan-2-one is illustrated.

Reduction of the $\Delta^4$ bond in a gon-4-en-3-one (I) preferably by means of an alkali metal such as lithium in liquid ammonia, produces the corresponding 5$\alpha$-gonan-3-one (V). Direct oxidation of the 5$\alpha$-gonan-3-one with chromic trioxide in acetic acid converts the 5$\alpha$-gonan-3-one which preferentially enolizes in the 2,3-position to the 2,3-dioic acid seco-5$\alpha$-gonane (VI). Pyrolysis of the seco-gonane yields the corresponding 5$\alpha$-A-norgonan-2-one. In the hereinbefore chromic trioxide procedure, if a hydroxy group is present at the 17-position, it will be oxidized to a 17-keto group and this will be present in the final product. However, if a hydroxy group is desired in the 17-position, the preferred procedure is to protect the 17-hydroxy group during the oxidation step by methods known to those skilled in the art, as for example, by esterifying the 17-hydroxy and subsequently hydrolyzing the 17-ester group.

It will be apparent from the disclosure herein to those skilled in the art that for the purposes of the invention, certain of the atoms of the gon-4-en-3-one starting materials could be substituted at certain positions with groups which do not interfere with the subsequent reactions and are not themselves effected by the subsequent reactions. Thus the 6- and 7-position can be substituted with alkyl groups in lieu of hydrogen such as, for example, but not limiting the generality thereof, methyl, ethyl and isopropyl. The 17-position can be substituted with hydroxy, keto or a carboxylic acid ester group as hereinbefore indicated or other oxygenated group convertible thereto.

When the starting compounds are substituted as hereinbefore recited, it will be apparent herefrom to those skilled in the art of chemistry that the final product formed following the hereinbefore described processes will bear correspondingly the same substituents or obvious variations thereof. Thus for the products of the invention produced thereby, such groups are the full equivalent of the invention as particularly claimed.

The following examples illustrate the best mode contemplated by the inventors of the manner of making the claimed compositions of the invention.

EXAMPLE I dl-13-Ethyl-17$\beta$-hydroxy-A-norgon-3-en-2-one

A. Preparation of dl-13-ethyl-17$\beta$-hydroxy-2-hydroxymethylene-gon-4-en-3-one Dissolve dl-13-ethyl-17$\beta$-hydroxy-gon-4-en-3-one (1.0 g.) in benzene (35 ml.) and add freshly distilled ethyl formate (2 ml.). In a nitrogen atmosphere, add sodium hydride (0.6 g.) and stir the reaction mixture at room temperature for 5 hours. Add methanol (5 ml.) to decompose excess sodium hydride and then water (400 ml.). Wash with ether to remove impurities and unreacted material. Acidify the aqueous layer and extract with ether. Remove the solvent and triturate with hexane to obtain dl-13-ethyl-17$\beta$-hydroxy-2-hydroxymethylene-gon-4-en-3-one (500 mg.), m.p. 76°–82° (d). $\lambda_{max}^{KBr}$ 2.98 and 6.11$\mu$. $\lambda_{max}^{EtOH}$ 250 and 307 m$\mu$ ($\epsilon$ 8,210 and 3,400).

B. Preparation of dl-13-ethyl-17$\beta$-hydroxy-2,3-seco-gona-4-ene-2,3-dioic acid Dissolve dl-13-ethyl-17$\beta$-hydroxy-2-hydroxymethylene-gon-4-en-3-one (5.2 g.) in a mixture of ethylacetate (52 ml.) and acetic acid (52 ml.). Cool the solution to −15° C. and bubble one equivalent of ozone into the mixture. Allow the mixture to warm to room temperature, add water (52 ml.) and 30 percent hydrogen peroxide (13 ml.) and allow the solution which is yellow and homogeneous to stand at 28° C. After 90 hours, extract with ether-benzene to collect acidic and neutral materials. Extract the organic layer with 3 × 50 ml. portions of 4% NaOH and extract the aqueous layer with ether. Acidify the aqueous alkaline layer to obtain a white oil. Extract with ether to collect the oil and combine the ether extracts. Wash the ether layer with water and dry. Remove the solvent to obtain dl-13-ethyl-17$\beta$-hydroxy-2,3-seco-gona-2,3-dioic acid (3.6 g.). $\lambda_{max}^{NaCl}$ 2.98–3.20, 5.87, 6.11$\mu$. $\lambda_{max}^{EtOH}$ 222 m$\mu$ C. Preparation of the Final Product Dissolve dl-13-ethyl-17$\beta$-hydroxy-2,3-seco-gon-4-ene-2,3-dioic acid (3.6 g.) in acetic anhydride (30 ml.) and reflux for 1 hour. Distill off unreacted acetic anhydride and raise the temperature of the reaction mixture gradually to about 250° C. to decarboxylate. When evolution of carbon dioxide ceases, cool the residue. Dissolve the dark oil residue in a mixture of ethanol (60 ml.) and 40 percent sodium hydroxide (7.5 ml.) and reflux for about 45 minutes. Cool, add water (50 ml.) and distill off the alcohol. Extract the alkaline solution with ether-benzene. Wash the organic layer with water and dry. Remove the solvent to obtain a brown gum, which when chromatographed on Grade III alumina (45 g.) and recrystallized from ether acetate-hexane, gives dl-13-ethyl-17$\beta$-hydroxy-A-norgon-3-en-2-one, m.p. 155°–158° C. $\lambda_{max}^{KBr}$ 2.90, 5.90, 5.97, and 6.18$\mu$. $\lambda_{max}^{CS_2}$ 3.00, 5.85 and 6.17$\mu$. $\lambda_{max}^{EtOH}$ 234 m$\mu$ ($\epsilon$ 15,450).

Analysis for $C_{18}H_{26}O_2$:
  Calculated: C, 78.79; H, 9.55%.
  Found: C, 78.51; H, 9.94%.

EXAMPLE II dl-13-Ethyl-5α-A-nor-gonan-2,17-dione

A. Preparation of dl-13-ethyl-17β-hydroxy-5α-gonan-3-one

Dissolve dl-13-ethyl-17β-hydroxy-gon-4-en-3-one (5.0 g.) in ether-dioxane (1 to 1) (100 ml.) and add the solution in a steady stream to lithium metal (500 mg.) in freshly distilled liquid ammonia (500 ml.). Discharge the blue color with solid ammonium chloride (25 g.). Remove the ammonia and bring the solution to 28° C. by adding warm water. Extract with ether to collect the organic material. Wash the ether extracts with water, brine and dry. Remove the solvent and chromatograph the residue on 210 g. of Grade III neutral alumina. Remove from the column with 100 percent benzene, recrystallize from ether to obtain dl-13-ethyl-17β-hydroxy-5α-gonan-3-one (3.8 g.), m.p. 134°–137° C. $\lambda_{max}^{KBr}$ 2.89, 5.87 and 11.30μ. $\lambda_{max}^{EtOH}$ no selective absorption.

Analysis for $C_{19}H_{30}O_2$:
    Calculated: C, 78.57; H, 10.41%.
    Found: C, 78.74; H, 10.34%.

B. Preparation of dl-13-ethyl-17-oxo-2,3-seco-5α-gonan-2,3-dioic acid

Dissolve dl-13-ethyl-17β-hydroxy-5α-gonan-3-one (1.6 g.) in acetic acid (85 ml.). Add to this mixture chromic anhydride (1.5 g.) in water (1.0 ml.). Maintain the reaction mixture at 60° C. for 5 hours with stirring. Concentrate to a volume of 10 ml. and add water (40 ml.). Partition the mixture between ether and 5 percent aqueous sodium hydroxide. Separate the alkaline solution, acidify with 10 percent hydrochloric acid and extract with ether. Wash the ether extracts with water and dry. Remove the solvent to obtain dl-13-ethyl-17-oxo-2,3-seco-5α-gonan-2,3-dioic acid, (500 mg.), m.p. 186°–190° C. $\lambda_{max}^{KBr}$ 3–4, 5.76 and 5.88μ.

C. Preparation of the Final Product

Dissolve dl-13-ethyl-17-oxo-2,3-seco-5α-gonan-2,3-dioic acid (500 mg.) in acetic anhydride (5 ml.) and reflux the mixture for 2 hours. Distill off the acetic anhydride and gradually raise the temperature to 245° C. When the evolution of carbon dioxide ceases, cool the residue and dissolve it in ether. Wash the ether solution with water, 5 percent sodium hydroxide, water, brine and dry. Remove the solvent, and filter through Grade II neutral alumina (5 g.) with benzene (80 percent)-petroleum ether (20 percent). Recrystallize from ether hexane to obtain dl-13-ethyl-A-nor-5α-gonan-2,17-dione, m.p. 127°–131° C. $\lambda_{max}^{KBr}$ 5.74, 5.79 μ. $\lambda_{max}^{EtOH}$ (no selective absorption).

Analysis for $C_{18}H_{26}O_2$:
    Calculated: C, 79.07; H, 9.41%.
    Found: C, 78.79; H, 9.55%.

EXAMPLE III dl-13-Ethyl-17β-hydroxy-A-nor-5α-gonan-2-one acetate

A. Preparation of dl-13-ethyl-17β-hydroxy-5α-gonan-3-one acetate

Dissolve dl-13-ethyl-17β-hydroxy-5α-gonan-3-one (1.9 g.) in pyridine (30 ml.) and add to acetic anhydride (2 ml.). Allow the mixture to stand at room temperature for 75 hours, pour it into water. Extract with ether to collect the organic material. Wash the ether extracts with water, 10 percent hydrochloric acid and brine. Remove the solvent, triturate the residue with ether to obtain dl-13-ethyl-17β-hydroxy-5α-gonan-3-one acetate (1.85 g.), m.p. 148°–152° C. $\lambda_{max}^{KBr}$ 5.76, 5.83, 8.02 and 11.31 μ. $\lambda_{max}^{EtOH}$ (no selective absorption).

Analysis for $C_{20}H_{32}O_3$:
    Calculated: C, 75.86; H, 9.70%.
    Found: C, 76.15; H, 9.86%.

B. Preparation of dl-13-ethyl-17β-hydroxy-2,3-seco-5α-gon-2,3-dioic acid, acetate Dissolve dl-13-ethyl-17β-hydroxy-5α-gonan-3-one acetate (1.8 g.) in acetic acid (85 ml.) and add chromic anhydride (1.7 g.) in water (1.5 ml.). Stir the reaction mixture and maintain at 90° C. for 5 hours. Distill off the solvent until only 10 ml. remain and add water (50 ml.). Collect the organic product with ether. Wash the ether layer with water and extract with 5 percent sodium hydroxide. Acidify the alkaline extract with 10 percent hydrochloric acid and extract with ether. Wash the ether extract with water, dry and remove the solvent to obtain dl-13-ethyl-17β-hydroxy-2,3-seco-5α-gon-2,3-dioic acid, acetate (1.0 g.), m.p. 222°–226°; $\lambda_{max}^{KBr}$ 3.00–4.00, 5.87μ.

C. Preparation of the Final Product

Dissolve dl-13-ethyl-17β-hydroxy-2,3-seco-5α-gon-2,3-dioic acid acetate (1.0 g.) in acetic anhydride (5 ml.) and reflux for 2 hours. Distill off the acetic anhydride gradually raising the temperature to about 220° C. to decarboxylate. When evolution of carbon dioxide ceases, allow the residue to cool, and dissolve in ether. Wash the ether solution with water, 5 percent sodium hydroxide, brine and dry. Remove the solvent and filter the residual gum through Grade III neutral alumina (45 g.) with benzene-petroleum ether (1:1). Recrystallize from hexane to obtain dl-13-ethyl-17β-hydroxy-A-nor-5α-gonan-2-one, acetate (200 mg.), m.p. 134°–137° C; $\lambda_{max}^{EtOH}$ 5.76, 8.06, 9.60 μ.

Analysis for $C_{20}H_{30}O_3$:
    Calculated: C, 75.43; H, 9.50%.
    Found: C, 75.57; H, 9.48%.

The subject matter which the applicants regard as their invention is particularly pointed out and distinctly claimed as follows:

1. dl-13-Ethyl-17β-hydroxy-A-norgon-3-en-2-one.

* * * * *